United States Patent [19]

Lieffers

[11] 4,420,938

[45] Dec. 20, 1983

[54] GEOTHERMAL POWER PLANT

[75] Inventor: William C. Lieffers, Fullerton, Calif.

[73] Assignee: Union Oil Company of California, Brea, Calif.

[21] Appl. No.: 393,460

[22] Filed: Jun. 29, 1982

Related U.S. Application Data

[63] Continuation of Ser. No. 173,995, Jul. 31, 1980, which is a continuation-in-part of Ser. No. 953,644, Oct. 23, 1978, Pat. No. 4,244,190.

[51] Int. Cl.$^3$ .............................................. F03G 7/00
[52] U.S. Cl. ................................. 60/641.5; 60/641.2
[58] Field of Search ................ 60/641.2, 641.3, 641.4, 60/641.5

[56] References Cited

U.S. PATENT DOCUMENTS

| | | | |
|---|---|---|---|
| 3,782,468 | 1/1974 | Kuwada | 60/641.5 |
| 3,845,627 | 11/1974 | Hutchinson | 60/641.3 |
| 3,846,986 | 11/1974 | Anderson | 60/641.2 |
| 3,862,545 | 1/1975 | Ellis et al. | 60/641.3 |
| 3,953,972 | 5/1976 | Awerbuch et al. | 60/641.5 |
| 4,016,075 | 8/1976 | Wilkins | 60/641.2 |
| 4,026,111 | 5/1977 | Matthews | 60/641.4 |
| 4,112,745 | 9/1978 | McCabe et al. | 60/641.2 |
| 4,120,158 | 10/1978 | Sheinbaum | 60/641.3 |
| 4,127,989 | 12/1978 | Mickelson | 60/641.2 |
| 4,138,851 | 2/1979 | Rogers et al. | 60/641.2 |
| 4,244,190 | 1/1981 | Lieffers | 60/641.5 |

OTHER PUBLICATIONS

Bishop et al., "Scaling and Corrosion in an Experimental Geothermal Power Plant," Paper Number SPE 6612 presented at the 1977 SPE-AIME International Symposium on Oilfield and Geothermal Chemistry, Jun. 1977, pp. 237-240.
Grens et al., "Field Evaluation of Scale Control Methods: Acidification," *Geothermal Resources Council Transactions*, vol. 1, May 1977, pp. 119-121.
Allen et al., "Abatement of Hydrogen Sulfide Emissions from the Geysers Geothermal Power Plant," *Proceedings, Second United Nations Symposium on the Development and Use of Geothermal Resources*, vol. 2, May 1975, pp. 1313-1315.
Axtmann et al., "Geothermal Chemical Engineering", *AICHE Journal*, vol. 22, No. 5, Sep. 1976, pp. 817-828.
Einarsson et al., "Disposal of Geothermal Waste Water by Reinjection", *Proceedings, 2nd United Nations Symposium on the Development and Use of Geothermal Resources*, May 1975, vol. 2, pp. 1349-1363.
Finney, "The Geysers Geothermal Power Plant", *Water-1972, AICHE Symposium Series*, No. 129, vol. 69, pp. 459-464.
Owen, "Precipitation of Amorphous Silica from High-Temperature Hypersaline Geothermal Brines", Lawrence Livermore Laboratory, University of California, ERDA Contract No. W-7405-Eng-48, Jun. 1975, pp. 1-20.
Wilson, "Environmental Aspects of the Multi-Purpose Development of Geothermal Resources", *Water-1973, AICHE Symposium Series*, No. 38, vol. 70, pp. 782-784.
Wilson et al., "Removal of Hydrogen Sulfide from Simulated Geothermal Brines by Reaction with Oxygen", Dow Chemical Company, Texas Division, prepared for U.S. Energy Research and Development Administration, Apr. 1977, pp. 1-54.
"New Process Converts Geothermal Hydrogen Sulfide Into Sulfur", *Chemical Week*, Jun. 11, 1975, p. 39.

*Primary Examiner*—Allen M. Ostrager
*Attorney, Agent, or Firm*—Dean Sandford; Daniel R. Farrell; Denton L. Anderson

[57] ABSTRACT

Useful energy is derived from steam flashed from hot geothermal brine having a tendency to deposit amorphous silica or calcite upon a reduction in the pressure or temperature of the brine. Steam condensate produced from the flashed steam is pressurized, acidified and preheated, and the acidified preheated steam condensate is mixed with the hot geothermal brine at a point upstream of the flash stage so as to form a hot aqueous mixture with a reduced tendency for deposition of amorphous silica or calcite.

9 Claims, 1 Drawing Figure

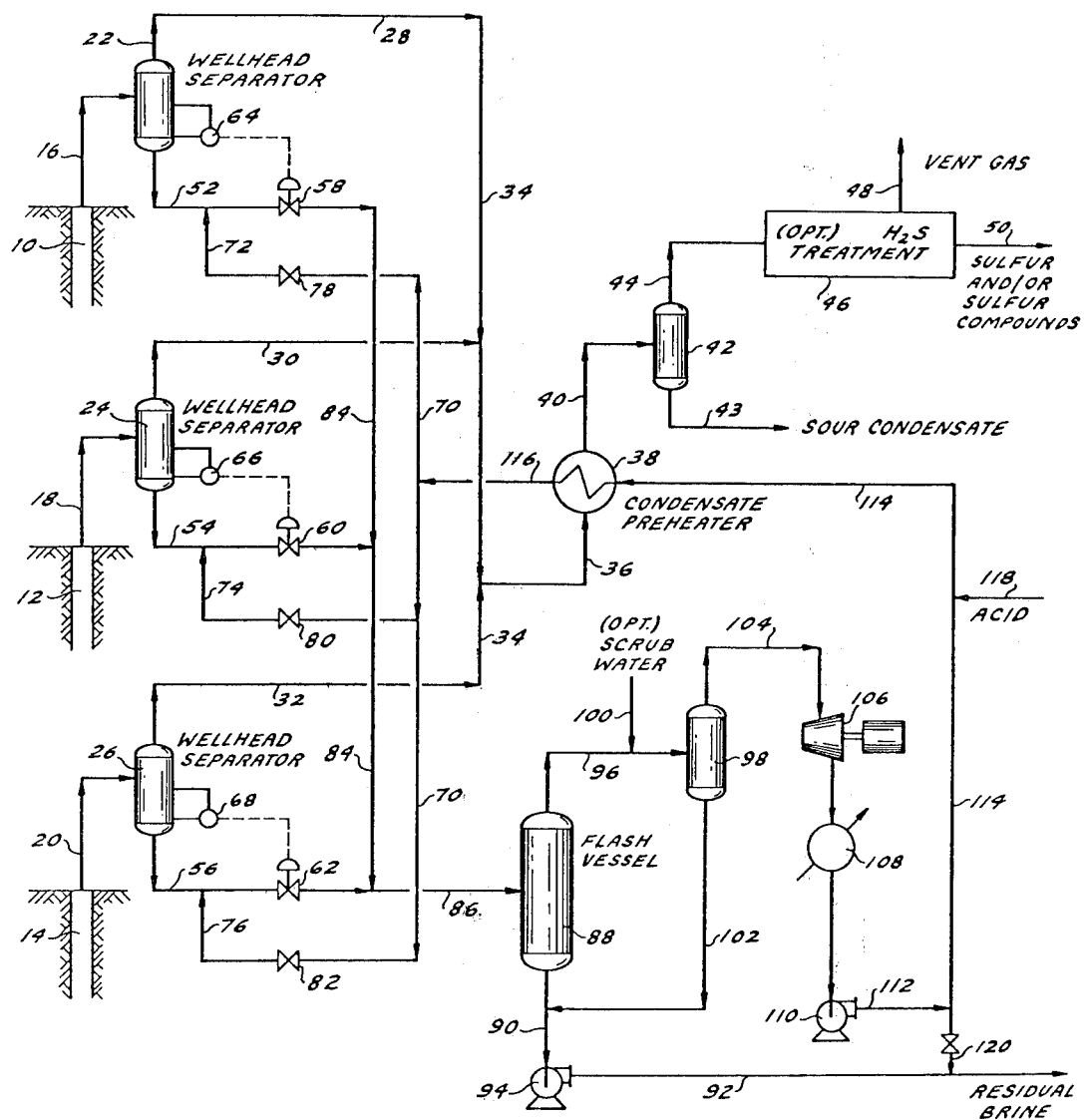

GEOTHERMAL POWER PLANT

RELATED APPLICATION

This is a continuation of copending application Ser. No. 173,995, filed July 31, 1980, which in turn is a continuation-in-part of application Ser. No. 953,644, filed Oct. 23, 1978, now U.S. Pat. No. 4,244,190.

BACKGROUND OF THE INVENTION

1. Field of the Invention

This invention relates to the utilization of geothermal energy, and more particularly to a process for deriving useful energy from geothermal brines.

2. Description of the Prior Art

As conventional hydrocarbon fuel resources have become less abundant and more expensive, a worldwide emphasis has been placed on the development of alternative energy resources, such as geothermal energy resources. Electricity and other forms of useful energy can be derived from geothermal resources by producing geothermal steam and/or aqueous geothermal liquids from a subterranean geothermal reservoir and processing the produced geothermal fluid in surface facilities to extract thermal energy therefrom. Of particular interest is the generation of electricity by passing geothermal steam, such as geothermal steam flashed from a hot geothermal brine, through a steam turbine/generator.

Most hot aqueous geothermal fluids are produced from subterranean geothermal reservoirs as a two-phase fluid comprising a vapor phase containing steam and non-condensible gases, such as hydrogen sulfide, and a hot liquid phase or "brine" containing heavy and/or transition metals, silica and other scale-forming species. Apart from the precipitation, scaling and corrosion problems associated with the hydrogen sulfide content of these two-phase fluids (as discussed in U.S. Pat. No. 4,244,190), other scale-forming species, such as iron, calcite and silica, pose severe problems which must be overcome to achieve the successful derivation of useful energy therefrom. The scale-forming tendencies of these geothermal brines vary widely, roughly in proportion to their salt content, from brines having little or no tendency to deposit amorphous silica, calcite or the like to brines having severe scaling tendencies. In the handling of geothermal brines having a severe tendency to deposit amorphous silica or calcite upon a reduction in its pressure or temperature, it has been particularly difficult to flash motive steam from such a brine without undesirably causing so much deposition of amorphous silica and/or calcite in and/or upstream of the flash vessel that continuous derivation of useful energy from such brines has been extremely difficult at best. Thus, a need exists for a practical process for deriving useful energy from such brines.

Accordingly, it is a primary object of this invention to provide a practical process for the derivation of useful energy from geothermal brines having relatively severe tendencies to deposit amorphous silica or calcite upon a reduction in the temperature or pressure of the brine.

It is another object of this invention to provide a process in which the deposition of amorphous silica and/or calcite from a hot geothermal brine is substantially inhibited during the flashing of steam from the brine.

Further objects, advantages and features of the invention will become apparent to those skilled in the art from the following description when taken in conjunction with the accompanying drawing.

SUMMARY OF THE INVENTION

Briefly, the invention provides a process for deriving useful energy from a hot geothermal brine having a tendency to deposit amorphous silica or calcite, in which acidified preheated steam condensate is mixed with the brine to form a hot aqueous mixture having a reduced tendency to deposit amorphous silica and/or calcite. High quality steam is then flashed from the aqueous mixture and used to derive useful energy, such as by expansion in a steam tubine/generator. Steam condensate formed from the high quality steam is preheated and then recycled for mixture with additional hot geothermal brine. An acid is added to the recycled condensate to lower the pH of the aqueous mixture. The process of this invention substantially inhibits the deposition of amorphous silica and/or calcite during the flashing of steam from the brine with only a minimal reduction in the amount of useful energy derived, and this reduction in energy recovery is believed to be more than offset by the substantial reduction in operational expenses resulting from the inhibition of silica and/or calcite deposition.

BRIEF DESCRIPTION OF THE DRAWING

The invention will be more readily understood by reference to the drawing which is a simplified schematic flow diagram illustrating one embodiment of the process of this invention.

DETAILED DESCRIPTION OF THE INVENTION

Precipitation, scaling and corrosion are major concerns in the derivation of useful energy from hot geothermal brines, particularly brines having very high concentrations of scale-forming species, such as barium, heavy and/or transition metals, hydrogen sulfide, silica, calcite and the like. My U.S. Pat. No. 4,244,190, the disclosure of which is herein incorporated by reference, describes in detail various preferred methods for inhibiting the formation of heavy and/or transition metal sulfides. It has been found that, even when such sulfide scales are avoided, undesirably large amount of amorphous silica and/or iron-enriched amorphous silica (herein collectively referred to as "amorphous silica") and/or calcite may deposit from certain hot geothermal brines as the temperature or pressure of these brines is reduced. These deposits tend to form in the flow lines leading up to the flash vessel as well as in the flash vessel and therefore have a serious adverse effect on the process. By substantially inhibiting the deposition of amorphous silica and/or calcite during the flashing of steam from the hot geothermal brine, the economics of the process would improve substantially even if later treatment of the residual brine from the flash vessel is required to condition the brine for disposal, such as for reinjection into the geothermal reservoir.

Referring to the drawing, hot two-phase geothermal fluids comprising (1) geothermal vapor containing steam and non-condensible gases, such as carbon dioxide and hydrogen sulfide, and (2) hot geothermal brines containing dissolved heavy and/or transition metals, calcite and silica are produced from wells 10, 12 and 14 and are conducted through conduits 16, 18 and 20, respectively, to corresponding wellhead separators 22, 24 and 26. In each wellhead separator the geothermal vapor is separated from the hot geothermal brine. Although illustrated as a single stage wellhead separator, one or more of wellhead separators 22, 24 and 26 may be a multistage separator, as disclosed in Ser. No. 953,644, so as to facilitate separation of hydrogen sulfide from the geothermal brine. The geothermal vapors are conducted from wellhead separators 22, 24 and 26 through conduits 28, 30 and 32, respectively, and are preferably combined in vapor header 34 for subsequent use, treatment and/or disposal. In the preferred embodiment illustrated, the combined geothermal vapor is conducted from vapor header 34 through conduit 36, condensate preheater 38 and conduit 40 into separator 42. In condensate preheater 38, the geothermal vapor is cooled by indirect heat exchange with recycled steam condensate with the result that some of the steam in the geothermal vapor will condense to form sour condensate, i.e., steam condensate containing some hydrogen sulfide, which is recovered through conduit 43. This sour condensate may be reinjected into the geothermal reservoir or, if required, may be used to supplement the clean steam condensate for mixture with the separated brine. The remaining uncondensed geothermal vapor is conducted from separator 42 through conduit 44 either for venting to the atmosphere or for treatment to convert and/or remove hydrogen sulfide, as indicated generally by box 46. Preferably, the uncondensed vapor is treated by one of the methods disclosed in Ser. No. 953,644 to convert substantially all of the hydrogen sulfide to sulfur and/or other sulfur compounds of a higher sulfur oxidation state and to remove a substantial portion of the sulfur and/or sulfur compounds from the treated vapor so as to form an environmentally acceptable vent gas. The vent gas may be vented to the atmosphere through conduit 48 and the sulfur and/or sulfur compounds may be recovered or sent to disposal through conduit 50.

Hot geothermal brine is withdrawn from wellhead separators 22, 24 and 26 through conduits 52, 54 and 56, respectively, with their flow rates being controlled by automatic control valves 58, 60 and 62, respectively, in response to the corresponding level controllers 64, 66 and 68. Acidified and preheated steam condensate is introduced from condensate header 70 through conduits 72, 74 and 76 into conduits 52, 54 and 56, respectively, for mixture with the separated brine flowing therethrough so as to form hot aqueous mixtures having reduced tendencies for deposition of amorphous silica and/or calcite. The amount of acidified preheated steam condensate introduced for mixture with the brine in conduits 52, 54 and 56 is controlled by valves 78, 80 and 82 mounted in conduits 72, 74 and 76, respectively. Equal amounts of acidified preheated steam condensate can be introduced into conduits 52, 54 and 56, or, alternatively, the amount of acidified preheated steam condensate introduced into each of conduits 52, 54 and 56 can be selected in view of the volume and/or properties of the separated brines from each of the corresponding wellhead separators so as to increase the overall effect of the condensate recycle on energy recovery and deposition of amorphous silica and/or calcite. Where the separated brines have varying tendencies to deposit amorphous silica and/or calcite, it is preferred that proportionally larger amounts of acidified preheated steam condensate are mixed with the separated brines having more severe depositional tendencies so as to maximize the overall silica and/or calcite deposition-inhibiting effect of such mixing. Typically, the volume of acidified preheated condensate recycled for admixture with a separated brine will be less than about 30 percent of the volume of separated brine, preferably between about 3 and about 20 percent. Good results are obtained when the volume of acidified preheated condensate mixed with the separated brine is between about 5 and about 15 percent of the volume of the separated brine.

The hot aqueous mixtures resulting from the mixing of the acidified preheated steam condensate and separated brine are then preferably combined in brine header 84 and the combined hot aqueous fluid is conducted from header 84 through conduit 86 into flash vessel 88. Passage of the aqueous mixtures through control valves 58, 60 and 62, header 84 and conduit 86 substantially reduces the pressure of these mixtures and results in the flashing of a portion thereof to form high quality steam, i.e., steam having little or no hydrogen sulfide or other non-condensible gases. The amount of steam flashed may be less than, equal to or greater than the amount of steam condensate added to the separated brine. Typically, between about 2 and about 30 percent, preferably between about 5 and about 20 percent, of the aqueous mixture will be flashed to form steam. Good results are obtained when between about 5 and about 10 percent of the aqueous mixture is flashed to form steam. The residual brine is separated from the high quality steam in flash vessel 88 and is withdrawn through conduits 90 and 92 by pump 94, preferably for reinjection into the geothermal reservoir. The high quality steam separated from the residual brine in flash vessel 88 is preferably conducted from flash vessel 88 through conduit 96 into steam scrubber 98. Optionally, scrub water, such as a portion of the preheated steam condensate or relatively cool condensate, may be introduced through conduit 100 to remove any entrained liquids and/or solids from the high quality steam. The scrub water, liquids and/or solids are separated from the high quality steam in steam scrubber 98 and, preferably, are conducted through conduit 102 for combination with the residual brine in conduit 90. The scrubbed steam from steam scrubber 98 is conducted through conduit 104 into the inlet of steam turbine/generator 106 wherein useful energy in the form of electricity is derived by expansion of the steam.

The effluent from steam turbine/generator 106 is cooled in condenser 108 to condense the steam to steam condensate. The steam condensate is pressurized by pump 110 and at least a portion of the pressurized steam condensate is conducted through conduits 112 and 114 into condensate preheater 38 wherein the steam condensate is preheated by indirect heat exchanger with the geothermal vapor introduced through conduit 36. As an alternative to condensate preheater 38, the steam condensate in conduit 114 could be preheated by injecting high temperature, pressurized steam into conduit 114. In any event, the preheated steam condensate is then conducted through conduit 116 into condensate header 70 for eventual mixing with additional brine as described above (Acidification of the condensate prior to its being mixed with geothermal brine is discussed below.)

Typically, between about 20 and about 90 percent of the steam condensate in conduit 112 will be recycled for preheating in condensate preheater 38 and mixture with the separated brines in conduits 52, 54 and 56. Preferably, between about 30 and about 80 percent, more preferably between about 50 and about 75 percent, of the steam condensate in the cooled turbine effluent will be preheated and recycled for mixture with additional separated brine. In one preferred embodiment of the process of this invention, a portion of the steam condensate which is not recycled for admixture with the separated brine is passed in indirect heat exchange relationship with the geothermal vapors to generate additional motive steam for passage through steam turbine/generator 106 with the high quality steam from flash vessel 88. Excess steam condensate in conduit 112 may be used as scrubbing water introduced through conduit 100 and/or in the hydrogen sulfide treatment process as disclosed in U.S. Pat. No. 4,244,190. Alternatively, or in addition, excess condensate can be introduced through conduit 120 for mixture with the residual brine in conduit 92.

Although not fully understood, the recycling of acidified preheated steam condensate in the process of this invention results in a substantial inhibition of amorphous silica and/or calcite deposition in conduits 52, 54 and 56, header 84, conduit 86 and flash vessel 88. The effect is greater than that which could be attributed merely to the dilution of the brine, since recycling cool condensate or the addition of other cool diluent has been found to have little beneficial effect, or even an adverse effect, on such deposition. Preferably, the acidified steam condensate is preheated to as high a temperature as is economically practical prior to its mixture with the separated brine. Typically, the condensate will be heated to within at least about 250° F. of the temperature of the separated brine with which it will be mixed. Preferably, the condensate is preheated to a temperature between about 20 and about 200° F. less than the temperature of the separated brine, and good results are obtained when the condensate is preheated to a temperature between about 100° F. and about 150° F. less than the temperature of the separated brine.

The acidified preheated steam condensate serves to inhibit the initiation of amorphous silica and/or calcite deposition. Once such deposition has been initiated, the subsequent addition of steam condensate would have a much lesser effect on inhibiting further deposition. Thus, it is critical that the acidified preheated steam condensate be mixed with the separated brine before any significant reduction in temperature or pressure of the brine causes the initiation of amorphous silica and/or calcite deposition. Using the pressure of the initial (or sole) wellhead separator as a reference, the acidified preheated steam condensate should be added to the separated brine when the brine is at a pressure between about the initial wellhead separator pressure (IWSP) and about 300 pounds per square inch (p.s.i.) less than the initial wellhead separator pressure (i.e., IWSP minus 300 p.s.i.), more preferably between about the initial wellhead separator pressure and about 150 p.s.i. less than the initial wellhead separator pressure. Good results are obtained when the acidified preheated condensate is added to the separated brine before the pressure of the brine is reduced more than about 50 p.s.i. below the initial wellhead separator pressure. The corresponding temperature of the separated brine at a point just upstream of where the condensate is mixed with the brine should be between about the temperature of the initial wellhead separator (IWST) and about 100° F. less than the initial wellhead separator temperature (i.e., IWST minus 100° F.), more preferably between about the initial wellhead separator temperature and about 30° F. less than the initial wellhead separator temperature. Good results are obtained when the acidified preheated condensate is added to the brine before the brine temperature is reduced more than about 10° F. below the initial wellhead separator temperature. Preferably, the acidified preheated condensate is mixed with the separated brine from the last wellhead separator stage (or from the initial or an intermediate wellhead separator stage depending upon the pressure drop between these stages) at a convenient point upstream of the valve or other pressure reducing device used to cause the substantial reduction in the pressure of the brine upstream of the flash vessel. Where more than one flash stage is used to generate motive steam, the preheated condensate is preferably mixed with the brine upsteam of the first flash vessel.

In order to acidify the steam condensate prior to its being mixed with geothermal brine, an inexpensive mineral acid is added to the steam condensate either through conduit 118 into conduit 114 upstream of the condensate preheater 38, or, alternatively, through a conduit (not shown) into header 70 or conduits 72, 74 and 76 downstream of condensate preheater 38. The mineral acid selected should be one which will not cause any scale formation upon mixing with the separated brine. For example, sulfuric acid should not be used where the separated brine contains sufficient barium to make barium sulfate precipitation a problem. Hydrochloric acid is preferred due to its low cost, availability and compatability with geothermal brines. Any lowering of the pH of the brine will assist in inhibiting amorphous silica and/or calcite to some degree, and, of course, too much acid addition could cause excessive corrosion of the process equipment. It is preferred that sufficient acid be added to lower the pH of the steam condensate being recycled below 7.0, preferably between about 4.0 and 7.0. Good results are obtained when the pH of the steam condensate is lowered to between about 5.0 and about 6.5 The condensate in conduit 112 will typically have a pH between about 6.0 and about 9.5. Thus, to achieve the aforesaid desired pH, the pH of the condensate should be lowered by between about 0.5 and about 6.0 pH units, more preferably between about 1 and about 3 pH units.

While particular embodiments of the invention have been described, it will be understood, of course, that the invention is not limited thereto since many obvious modifications can be made, and it is intended to include any such modifications as will fall within the scope of the appended claims.

Having now described the invention, I claim:

1. A process for treating and deriving useful energy from a hot geothermal brine having a tendency to deposit amorphous silica and/or calcite upon a reduction in the temperature or pressure of said brine, which process comprises the steps of:
   (a) mixing said hot geothermal brine with an acidified preheated steam condensate so as to form a hot aqueous mixture having a reduced tendency for depositing amorphous silica and/or calcite;
   (b) reducing the pressure of the hot aqueous mixture from step (a) so as to flash a portion thereof, thereby forming high quality steam and residual brine;
   (c) deriving useful energy from said high quality steam and condensing said steam to form steam condensate;

(d) pressurizing at least a portion of the steam condensate from step (c), and preheating and acidifying the pressurized portion, thereby forming acidified preheated steam condensate; and (e) recycling the acidified preheated steam condensate from step (d) for mixture with said hot geothermal brine in step (a), whereby the mixing of said acidified preheated steam condensate with said hot geothermal brine in step (a) substantially inhibits the deposition of amorphous silica and/or calcite during step (b).

2. The process defined in claim 1 wherein said condensate is acidified by adding a selected acid to the pressurized portion of steam condensate in step (d).

3. A process for treating and deriving useful energy from a hot two-phase geothermal fluid produced from a subterranean geothermal reservoir, said two-phase fluid comprising a geothermal vapor and a hot geothermal brine having a tendency to deposit amorphous silica and/or calcite upon a reduction in the temperature or pressure of said brine, which process comprises the steps of:

(a) separating said geothermal vapor from said hot geothermal brine at a first superatmospheric pressure;

(b) mixing the separate geothermal brine from step (a) with an acidified preheated steam condensate so as to form a hot aqueous mixture having a reduced tendency for depositing amorphous silica and/or calcite;

(c) reducing the pressure of the hot aqueous mixture from step (b) so as to flash a portion thereof, thereby forming high quality steam and residual brine;

(d) deriving useful energy from said high quality steam and condensing said steam to form steam condensate;

(e) pressurizing at least a portion of the steam condensate from step (d), and acidifying and preheating the pressurized portion, thereby forming acidified preheated steam condensate; and (f) recycling the acidified preheated steam condensate from step (e) for mixture with said separated geothermal brine in step (b), with the amount of said acidified preheated steam condensate mixed with said separated geothermal brine in step (b) being sufficient to substantially inhibit the deposition of amorphous silica and/or calcite during step (c).

4. The process defined in claim 3 wherein said separated geothermal brine is mixed with said acidified preheated steam condensate at about said first superatmospheric pressure.

5. The process defined in claim 3 wherein said pressurized portion of steam condensate is preheated in step (e) by indirect heat exchange with at least a portion of the separated geothermal vapor from step (a).

6. The process defined in claim 3 wherein said condensate is acidified by adding an acid to the pressurized portion of steam condensate from step (e) so as to lower its pH.

7. The process defined in claim 3 wherein said separated geothermal vapor contains hydrogen sulfide and wherein said process further comprises the steps of treating said separated geothermal vapor to convert substantially all of said hydrogen sulfide to sulfur and/or other sulfur compounds of a higher sulfur oxidation state; removing at least a substantial portion of said sulfur and/or sulfur compounds from the treated geothermal vapor to form an environmentally acceptable vent gas; and discharging at least a portion of said vent gas to the atmosphere.

8. A process for treating and deriving useful energy from a plurality of hot two-phase geothermal fluids produced through a corresponding plurality of production wells from one or more subterranean geothermal reservoirs, said two-phase fluids comprising (1) geothermal vapors and (2) hot geothermal brines having varying tendencies to deposit amorphous silica and/or calcite upon a reduction in the temperature or pressure of said brine, which process comprises:

(a) passing each of said two-phase fluids into a corresponding wellhead separator so as to separate its geothermal vapor from its geothermal brine;

(b) mixing the geothermal brine from each wellhead separator with preselected amounts of an acidified preheated steam condensate so as to form a corresponding plurality of hot aqueous mixtures each having a lower tendency for depositing amorphous silica and/or calcite than the corresponding separated brine, said preselected amounts of acidified steam condensate to be mixed with each separated brine being selected in proportion to the amorphous silica and/or calcite depositional tendencies of that separated brine so as to maximize the overall amorphous silica and/or calcite deposition-inhibiting effect of said mixing;

(c) reducing the pressure of and combining said hot aqueous mixtures so as to flash a portion thereof to form high quality steam and residual brine;

(d) separating said high quality steam from said residual brine;

(e) passing said high quality steam through a steam turbine/generator so as to generate electricity and condensing said steam to form steam condensate;

(f) pressurizing at least a portion of said steam condensate from step (e), and acidifying and preheating the pressurized portion by indirect heat exchange with at least a portion of said geothermal vapor, thereby forming acidified preheated steam condensate;

(g) recycling the acidified preheated steam condensate from step (f) for mixture with the geothermal brines in step (b), whereby the mixing of said acidified preheated steam condensate with said geothermal brines in step (b) substantially inhibits the deposition of amorphous silica and/or calcite during steps (c) and (d).

9. The process in claim 8 wherein said geothermal vapor contains hydrogen sulfide and wherein the process further comprises the steps of, after cooling of the geothermal vapor in step (f), treating the cooled geothermal vapor so as to convert substantially all of said hydrogen sulfide to sulfur and/or other sulfur compounds of a higher sulfur oxidation state; removing at least a substantial portion of said sulfur and/or sulfur compounds from the treated geothermal vapor to form an environmentally acceptable vent gas; and discharging at least a portion of said vent gas to the atmosphere.

* * * * *